US011094422B2

(12) United States Patent
Horn et al.

(10) Patent No.: US 11,094,422 B2
(45) Date of Patent: Aug. 17, 2021

(54) SYSTEMS AND METHODS FOR ASSAYING AN OBJECT

(71) Applicant: Atomic Energy of Canada Limited / Energie Atomique du Canada Limitee, Chalk River (CA)

(72) Inventors: Dag Horn, Deep River (CA); Krassimir Stoev, Ottawa (CA)

(73) Assignee: Atomic Energy of Canada Limited/ Energie Atomique Du Canada Limitess, Chalk River (CA)

( * ) Notice: Subject to any disclaimer, the term of this patent is extended or adjusted under 35 U.S.C. 154(b) by 226 days.

(21) Appl. No.: 16/142,541

(22) Filed: Sep. 26, 2018

(65) Prior Publication Data

US 2019/0103196 A1    Apr. 4, 2019

Related U.S. Application Data

(60) Provisional application No. 62/565,632, filed on Sep. 29, 2017.

(51) Int. Cl.
| | | |
|---|---|---|
| *G21C 17/017* | (2006.01) | |
| *G01N 23/221* | (2006.01) | |
| *G01N 23/00* | (2006.01) | |
| *G01N 23/22* | (2018.01) | |
| *G21G 4/04* | (2006.01) | |
| *H05G 2/00* | (2006.01) | |

(52) U.S. Cl.
CPC .......... *G21C 17/017* (2013.01); *G01N 23/00* (2013.01); *G01N 23/22* (2013.01); *G01N 23/221* (2013.01); *G21G 4/04* (2013.01); *H05G 2/00* (2013.01)

(58) Field of Classification Search
CPC .... G21C 17/017; G21C 17/04; G21C 17/048; G01N 23/22; G01N 23/2208; G01N 23/221
See application file for complete search history.

(56) References Cited

U.S. PATENT DOCUMENTS 4,031,388 A * 6/1977 Morita .................... G21H 5/00
378/45
4,925,621 A    5/1990 Muth et al.
4,980,901 A * 12/1990 Miller .................. G01N 23/221
378/45

(Continued)

OTHER PUBLICATIONS

Tickner et al., Improving the sensitivity and accuracy of gamma activation analysis for the rapid determination of gold in mineral ores, Applied Radiation and Isotopes, vol. 122, 2017, pp. 28-36. (Year: 2017).*

(Continued)

*Primary Examiner* — Sharon M Davis
(74) *Attorney, Agent, or Firm* — Kevin Shipley; Fogler, Rubinoff LLP

(57) ABSTRACT

A method for assaying a wall of a pressure tube for a nuclear reactor is disclosed. The wall has a matrix material and deuterium nuclei in the matrix material. The method includes: (a) transmitting gamma rays into the matrix material to induce photodisintegration of at least some of the deuterium nuclei, whereby reaction particles of the nuclei are emitted from the wall; (b) detecting at least some of the reaction particles emitted in step (a) using a particle detector; and (c) generating particle signals in response to detecting the particles in step (b).

20 Claims, 12 Drawing Sheets

(56) References Cited

U.S. PATENT DOCUMENTS

| | | | |
|---|---|---|---|
| 7,388,369 B2 * | 6/2008 | Edsinger | G21C 17/06 |
| | | | 324/230 |
| 7,563,022 B2 | 7/2009 | Tashiro et al. | |
| 2009/0067574 A1 * | 3/2009 | Johnson | G01V 5/0033 |
| | | | 378/57 |

OTHER PUBLICATIONS

Couet et al., Cold neutron prompt gamma activation analysis, a non-destructive technique for hydrogen level assessment in zirconium alloys, Journal of Nuclear Materials, vol. 425, Issues 1-3, 2012, pp. 211-217. (Year: 2012).*

* cited by examiner

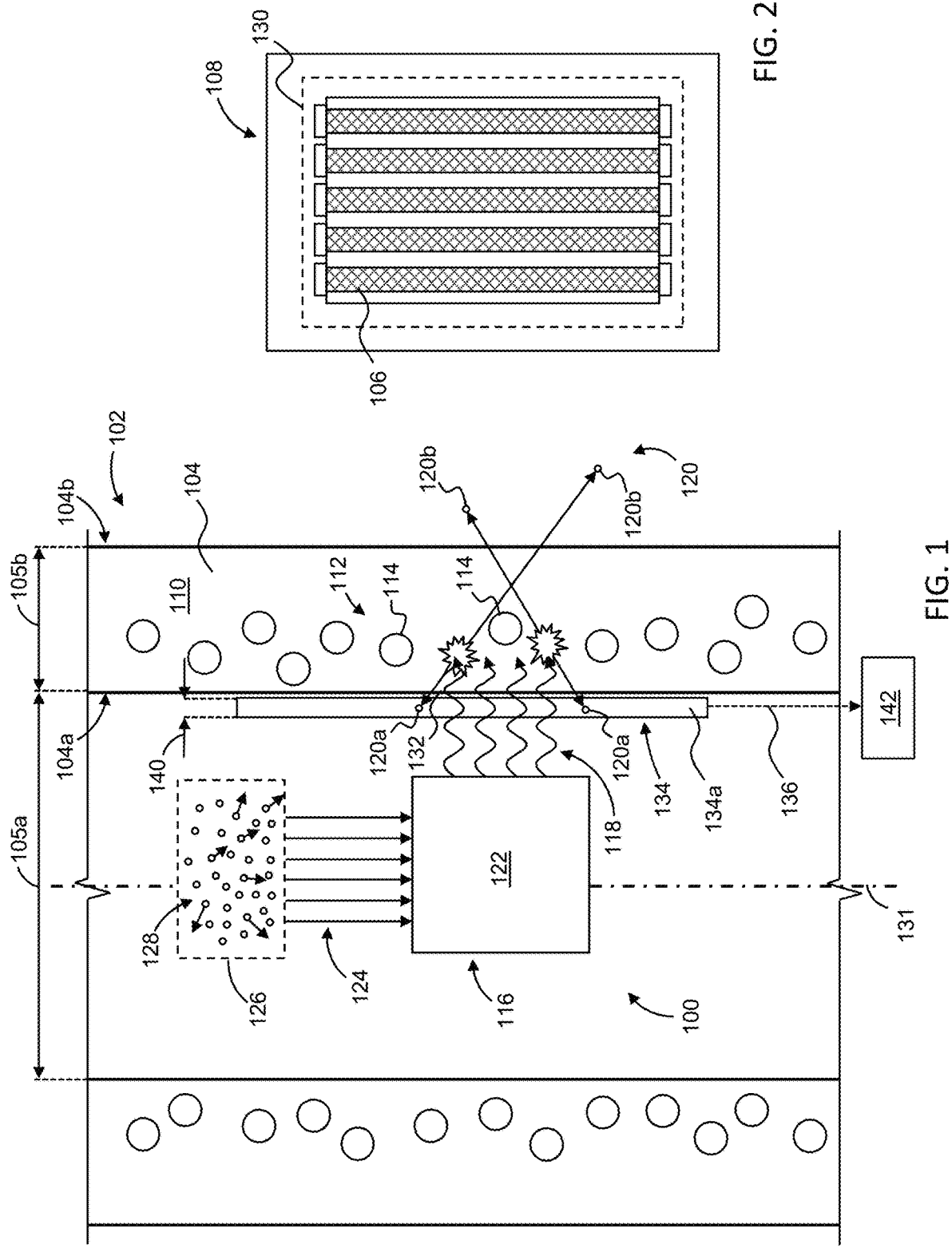

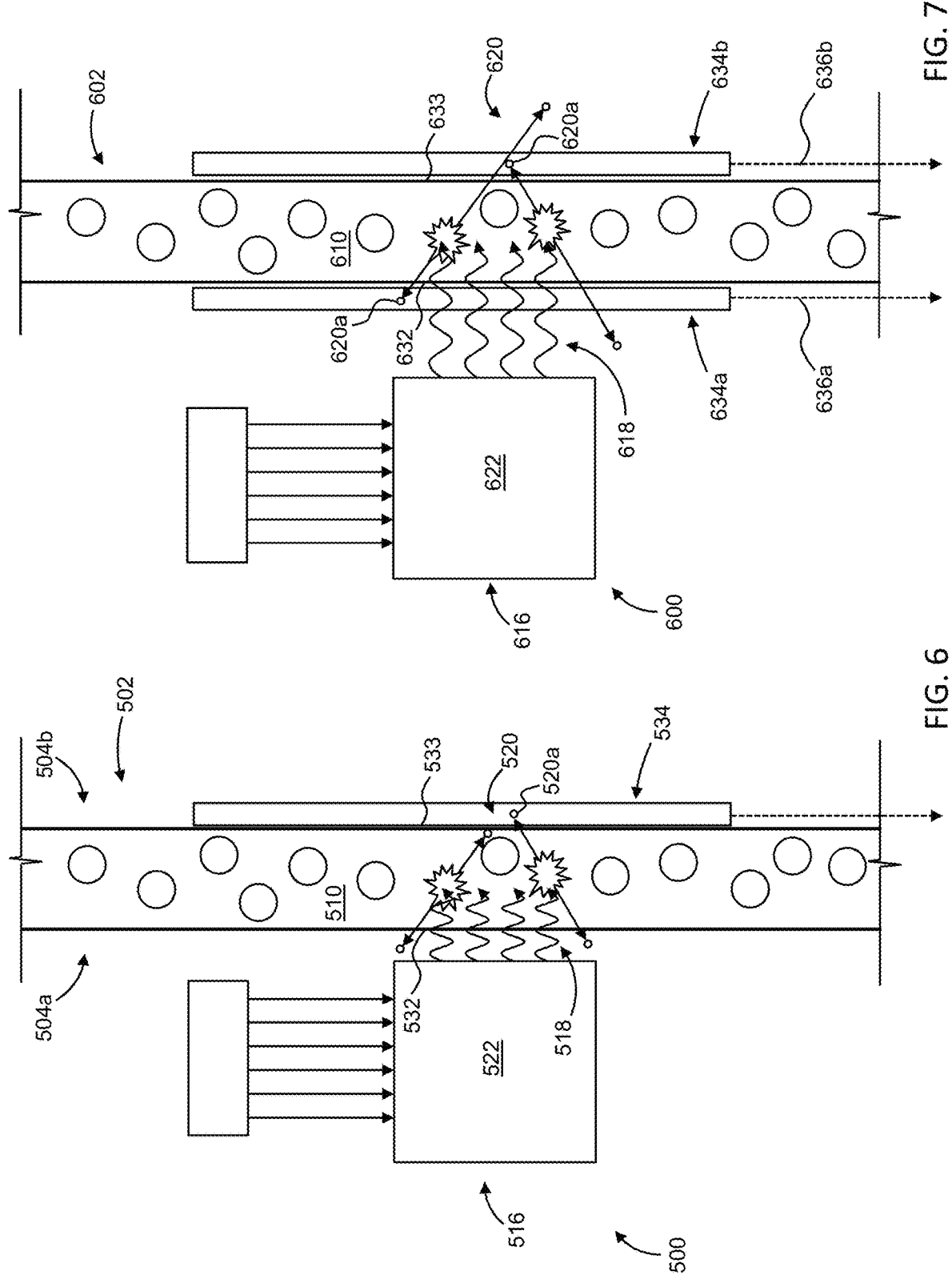

SYSTEMS AND METHODS FOR ASSAYING AN OBJECT

CROSS-REFERENCE TO RELATED APPLICATIONS

This application claims the benefit of U.S. provisional application No. 62/256,632, filed Sep. 29, 2017 and entitled Systems and Methods for Assaying an Object, the entirety of which is incorporated herein by reference.

FIELD

The disclosure relates to one or more systems and methods associated with assay of an object. More specifically, the disclosure relates to non-destructive assay of an object, such as a wall of a pressure tube for a nuclear reactor, to determine a concentration of deuterium in the object.

BACKGROUND

U.S. Pat. No. 4,925,621 (Muth et al.) relates to a method and apparatus for taking samples from the pressure tubes of a nuclear reactor in-situ, and particularly for deuterium analysis, and discloses a sampling tool for obtaining a sample of the pressure tube of a CANDU type of nuclear reactor for deuterium analyses without removing the pressure tube from the reactor. The preferred sampling tool comprises two cutters and means for capturing the removed material, wherein one cutter removes the surface oxide layer, and the second cutter removes a sample for analysis. The cutters and cutting operation are designed to avoid damaging the integrity of the pressure tube to allow it to remain in service. In the preferred embodiment, the sampling tool performs the surface and sample removal operation with the fueling equipment with simple linear movement.

U.S. Pat. No. 7,563,022 (Tashiro et al.) discloses an apparatus and method for determining terminal solid solubility temperature in materials capable of forming hydrides, such as reactor pressure tubes. An inspection device is positioned within the reactor pressure tube under test and a pair of annular seals are radially deployed to seal a section of the pressure tube. Any water within the sealed section is displaced through the injection of gas and the heating of the sealed section to dry the tube and the device. A probe assembly on the device is deployed to contact the interior surface of the pressure tube and measure resistivity changes in the pressure tube wall as a function of temperature. The probe assembly includes a thermocouple probe for measuring temperature and transmit and receive coils for inducing eddy currents within the pressure tube wall. The pressure tube is allowed to cool at a predetermined rate, is reheated at a predetermined rate, and is allowed to cool again. Discontinuities within the temperature coefficient of resistivity indicate terminal solid solubility temperatures of precipitation or dissolution, which may be used to determine the hydrogen concentration of the sealed section of reactor pressure tube.

SUMMARY

The following summary is intended to introduce the reader to various aspects of the applicant's teaching, but not to define any invention.

According to some aspects, a method for assaying a wall of a pressure tube for a nuclear reactor is disclosed. The wall has a matrix material and deuterium nuclei in the matrix material. The method includes: (a) transmitting gamma rays into the matrix material to induce photodisintegration of at least some of the deuterium nuclei, whereby reaction particles of the nuclei are emitted from the wall; (b) detecting at least some of the reaction particles emitted in step (a) using a particle detector; and (c) generating particle signals in response to detecting the particles in step (b).

In some examples, the method further includes determining an attribute of the wall based at least in part on the particle signals. In some examples, the attribute includes a concentration of the deuterium nuclei in the matrix material. In some examples, the particle signals indicate a number of the reaction particles detected in step (b). In some examples, determining the attribute includes comparing the number of the reaction particles detected in step (b) with a predetermined reference value.

In some examples, the matrix material includes a zirconium alloy. In some examples, the zirconium alloy, includes at least one of Zircaloy-2 and Zr-2.5Nb.

In some examples, the method further includes, prior to step (a), subjecting an n-gamma radiator to a neutron flux to induce an n-gamma reaction, whereby the gamma rays transmitted in step (a) are emitted from the radiator. In some examples, the method further includes, prior to step (a), positioning the radiator proximate the wall. In some examples, the neutron flux comprises a thermal neutron flux. In some examples, the radiator comprises a thermal neutron cross-section of at least 2 barns. In some examples, the radiator comprises Nickel. In some examples, the radiator comprises Nickel-58.

In some examples, the method further includes, prior to step (a), positioning the radiator within a reactor core of the nuclear reactor, and wherein the neutron flux comprises ambient thermal neutron flux of the reactor core.

In some examples, the pressure tube is in situ within a reactor core of the nuclear reactor while at least steps (a) to (b) are performed.

In some examples, the gamma rays transmitted in step (a) have an energy of at least 7.5 MeV.

In some examples, the reaction particles comprise protons. In some examples, the protons have an energy of between about 1 MeV and about 3 MeV when emitted.

In some examples, step (a) includes transmitting the gamma rays into the matrix material through a first surface of the wall, and step (b) includes positioning the detector proximate the first surface and detecting at least some of the reaction particles emitted from the first surface.

In some examples, step a) includes transmitting the gamma rays into the matrix material through a first surface of the wall, and step (b) includes positioning the detector proximate a second surface of the wall spaced apart from the first surface, and detecting at least some of the reaction particles emitted from the second surface.

In some examples the first surface includes an inner surface of the pressure tube.

In some examples, the nuclear reactor includes a pressurized heavy-water reactor.

According to some aspects, a system for assaying a wall of a pressure tube for a nuclear reactor is disclosed. The wall has a matrix material and deuterium nuclei in the matrix material. The system includes: (a) a portable n-gamma radiator positionable proximate the wall. The radiator is configured to emit gamma rays via an n-gamma reaction when subjected to a neutron flux, and to transmit the gamma rays into the matrix material to induce photodisintegration of the deuterium nuclei, whereby reaction particles of the nuclei are emitted from the wall. The system further includes (b) a portable particle detector positionable proximate the wall. The detector is configured to detect at least some of the reaction particles emitted from the wall, and to generate particle signals in response to detection of the reaction particles.

In some examples, the matrix material includes a zirconium, alloy. In some examples, the zirconium, alloy includes at least one of Zircaloy-2 and Zr-2.5Nb.

In some examples, the neutron flux includes a thermal neutron flux. In some examples, the radiator comprises a thermal neutron cross-section of at least 2 barns. In some examples, the radiator includes Nickel. In some examples, the radiator includes Nickel-58. In some examples, the neutron flux includes an ambient thermal neutron flux of a reactor core of the nuclear reactor.

In some examples, the radiator is configured to emit the gamma rays at an energy of at least 7.5 MeV.

In some examples, the reaction particles include protons. In some examples, the protons have an energy of between about 1 MeV and about 3 MeV when emitted.

In some examples, the detector includes an active detector layer having a layer thickness in a direction of a proton flux of the protons, and the layer thickness is no greater than approximately a penetration distance of the reaction particles through the active detector layer. In some examples, the detector layer includes silicon and the layer thickness is no greater than approximately 60 microns.

In some examples, the radiator is positionable adjacent a first surface of the wall for transmitting the gamma rays into the matrix material through the first surface, and the detector is positionable adjacent the first surface for detecting at least some of the reaction particles emitted from the first surface.

In some examples, the radiator is positionable adjacent a first surface of the wall for transmitting the gamma rays into the matrix material through the first surface, and the detector is positionable adjacent a second surface of the wall spaced apart from the first surface for detecting at least some of the reaction particles emitted from the second surface.

In some examples, the system further includes a processor configured to determine an attribute of the wall based on the particle signals. In some examples, the attribute includes a concentration of the deuterium nuclei in the matrix material. In some examples, the particle signals indicate a number of the reaction particles detected by the particle detector. In some examples, the processor is configured to determine the attribute by comparing the number of the reaction particles detected by the particle detector with a predetermined reference value.

In some examples, the radiator is positionable adjacent an inner surface of the wall. In some examples, the detector is positionable adjacent an inner surface of the wall.

According to some aspects, an n-gamma radiator is used to induce photodisintegration of deuterium nuclei in a wall of a pressure tube in situ within a nuclear reactor core. In some examples, the reactor core comprises a pressurized heavy-water reactor core.

According to some aspects, a method for assaying an object having a matrix material and target nuclei in the matrix material is disclosed. The method includes: (a) subjecting an n-gamma radiator to a neutron flux to induce an n-gamma reaction, whereby gamma rays are emitted from the radiator; (b) transmitting the gamma rays emitted from the radiator in step (a) into the matrix material to induce photodisintegration of at least some of the target nuclei, whereby reaction particles of the nuclei are emitted from the object; (c) detecting at least some of the reaction particles emitted from the object in step (b) using a particle detector; and (d) generating particle signals in response to detecting the reaction particles in step (c).

In some examples, the method further includes determining an attribute of the object based at least in part on the particle signals. In some examples, the attribute includes a concentration of the target nuclei in the matrix material. In some examples, the particle signals indicate a number of the reaction particles detected in step (c). In some examples, determining the attribute includes comparing the number of the reaction particles detected in step (c) with a predetermined reference value.

In some examples, the target nuclei comprise deuterium nuclei.

In some examples, the matrix material includes a metal. In some examples, the matrix material includes a zirconium alloy. In some examples, the zirconium alloy includes at least one of Zircaloy-2 and Zr-2.5Nb.

In some examples, the neutron flux includes a thermal neutron flux.

In some examples, the radiator includes a thermal neutron cross-section of at least 2 barns. In some examples, the radiator includes Nickel. In some examples, the radiator includes Nickel-58.

In some examples, the gamma rays emitted in step (a) have an energy of at least 7.5 MeV.

In some examples, the photodisintegration includes a gamma-p reaction, and the reaction particles include protons.

In some examples, the protons have an energy of between about 1 MeV and about 3 MeV when emitted.

In some examples, the method further includes, prior to step (a), positioning the radiator proximate a first surface of the object, and in step (b), transmitting the gamma rays into the matrix, material through the first surface, and in step (c), positioning the detector proximate the first surface and detecting at least some of the reaction particles emitted, from the first surface.

In some examples, the method further includes, prior to step (a), positioning the radiator proximate a first surface of the object, and in step (b) transmitting the gamma rays into the matrix material through the first surface, and in step (c), positioning the particle detector proximate a second surface of the object spaced apart from the first surface and detecting at least some of particles emitted from the second surface.

In some examples, the object includes a wall of a pressure tube for a nuclear reactor. In some examples, the pressure tube is in situ within a reactor core of the nuclear reactor while at least steps (a) to (c) are performed. In some examples, the method further includes positioning the radiator within the reactor core, and wherein the neutron flux includes an ambient thermal neutron flux of the reactor core.

According to some aspects, a method for assaying an object having a matrix material and deuterium nuclei in the matrix material is disclosed. The method includes: (a) transmitting gamma rays into the matrix material to induce photodisintegration of at least some of the deuterium nuclei, whereby protons of the deuterium nuclei are emitted from the object; (b) detecting at least some of the protons emitted from the object in step (a) using a proton detector; and (c) generating particle signals in response to detecting the protons in step (b).

In some examples, the method further includes determining an attribute of the object based at least in part on the particle signals. In some examples, the attribute includes a concentration of the deuterium nuclei in the matrix material. In some examples, the particle signals indicate a number of the protons detected step (b). In some examples, determining the attribute comprises comparing the number of the protons detected in step (b) with a predetermined reference value.

In some examples, the matrix material includes a metal. In some examples, the matrix material includes a zirconium alloy. In some examples, the zirconium alloy includes at least one of Zircaloy-2 and Zr-2.5Nb.

In some examples, the method further incudes, prior to step (a), subjecting an n-gamma radiator to a neutron flux to induce an n-gamma reaction, whereby the gamma rays transmitted in step (a) are emitted from the radiator.

In some examples, the neutron flux includes a thermal neutron flux.

In some examples, the radiator includes a thermal neutron cross-section of at least 2 barns.

In some examples, the radiator includes Nickel. In some examples, the radiator includes Nickel-58.

In some examples, the gamma rays transmitted in step (a) have an energy of at least 7.5 MeV.

In some examples, the protons have an energy of between about 1 MeV and about 3 MeV when emitted.

In some examples, step (a) includes transmitting the gamma rays into the matrix material through a first surface of the object, and step (b) includes positioning the detector proximate the first surface and detecting at least some of the protons emitted from the first surface.

In some examples, step (a) includes transmitting the gamma rays into the matrix material through a first surface of the object, and step (b) includes positioning the detector proximate a second surface of the object spaced apart from the first surface and detecting at least some of the protons emitted from the second surface.

In some examples, the object includes a wall of a pressure tube for a nuclear reactor. In some examples, the pressure tube is in situ within a reactor core of the nuclear reactor while at least steps (a) to (b) are performed.

According to some aspects, a method for assaying an object having a metallic matrix material and target nuclei in the matrix material is disclosed. The method includes: (a) transmitting gamma rays into the metallic matrix material to induce photodisintegration of at least some of the target nuclei, whereby reaction particles of the nuclei are emitted from the object; and (b) detecting at least some of the reaction particles emitted from the object in step (a) using a reaction particle detector; and (c) generating particle signals in response to detecting the particles in step (b).

In some examples, the method further includes determining an attribute of the object based at least in part on the particle signals. In some examples, the attribute includes a concentration of the target nuclei in the matrix material. In some examples, the particle signals indicate a number of the reaction particles detected in step (b). In some examples, determining the attribute includes comparing the number of the reaction particles detected in step (b) with a predetermined reference value.

In some examples, the target nuclei include deuterium nuclei.

In some examples, the matrix material includes a zirconium alloy. In some examples, the zirconium alloy includes at least one of Zircaloy-2 and Zr-2.5Nb.

In some examples the method further includes, prior to step (a), subjecting an n-gamma radiator to a neutron flux to induce an n-gamma reaction, whereby the gamma rays transmitted in step (a) are emitted from the radiator.

In some examples, the neutron flux includes a thermal neutron flux.

In some examples, the radiator includes a thermal neutron cross-section of at least 2 barns. In some examples, the radiator includes Nickel. In some examples, the radiator includes Nickel-58.

In some examples, the gamma rays transmitted in step (a) have an energy of at least 7.5 MeV.

In some examples, the photodisintegration includes a gamma-p reaction, and the reaction particles include protons. In some examples, the protons have an energy of between about 1 MeV and about 3 MeV when emitted.

In some examples, step (a) includes transmitting the gamma rays into the metallic matrix material through a first surface of the object, and step (b) includes positioning the detector proximate the first surface and detecting at least some of the reaction particles emitted from the first surface.

In some examples, step (a) includes transmitting the gamma rays into the metallic matrix material through a first surface of the object, and step (b) includes positioning the detector proximate a second surface of the object spaced apart from the first surface and detecting at least some of the reaction particles emitted from the second surface.

In some examples, the object includes a wall of a pressure tube for a nuclear reactor. In some examples, the pressure tube is in situ within a reactor core of the nuclear reactor while at least steps (a) to (b) are performed.

According to some aspects, a system for assaying an object having a matrix material and target nuclei in the matrix material is disclosed. The system includes: (a) an n-gamma radiator configured to emit gamma rays via an n-gamma reaction when subjected to a neutron flux, and to transmit the gamma rays into the matrix material to induce photodisintegration of at least some of the target nuclei, whereby reaction particles of the nuclei are emitted from the object; and (b) a particle detector configured to detect at least some of the reaction particles emitted from the object, and to generate particle signals in response to detection of the particles.

In some examples, the target nuclei include deuterium nuclei.

In some examples, the matrix material includes a metal. In some examples, the matrix material includes a zirconium alloy. In some examples, the zirconium alloy includes at least one of Zircaloy-2 and Zr-2.5Nb.

In some examples, the neutron flux includes a thermal neutron flux. In some examples, the radiator includes a thermal neutron cross-section of at least 2 barns. In some examples, the radiator includes Nickel. In some examples, the radiator includes Nickel-58. In some examples, the radiator is configured to emit the gamma rays at an energy of at least 7.5 MeV.

In some examples, the photodisintegration includes a gamma-p reaction, and the reaction particles include protons. In some examples, the protons have an energy of between about 1 MeV and about 3 MeV when emitted.

In some examples, the detector includes an active detector layer having a layer thickness in a direction of a reaction particle flux of the reaction particles, and the layer thickness is no greater than approximately a penetration distance of the reaction particles through the active detector layer. In some examples, the active detector layer includes silicon and the layer thickness is no greater than approximately 60 microns.

In some examples, the radiator is positionable proximate a first surface of the object for transmitting the gamma rays into the matrix material through the first surface, and the detector is positionable proximate the first surface for detecting at least some of the reaction particles emitted from the first surface.

In some examples, the radiator is positionable proximate a first surface of the object for transmitting the gamma rays into the matrix material through the first surface, and the detector is positionable proximate a second surface of the object spaced apart from the first surface for detecting at least some of the reaction particles emitted from the second surface.

In some examples, the system further includes a processor configured to determine an attribute of the object based on the particle signals. In some examples, the attribute includes a concentration of the target nuclei in the matrix material. In some examples, the particle signals indicate a number of the reaction particles detected by the particle detector. In some examples, the processor is further configured to determine the attribute by comparing the number of the reaction particles detected by the particle detector with a predetermined reference value.

In some examples, the system further includes a neutron source for producing the neutron flux.

In some examples, the object includes a wall of a pressure tube for a nuclear reactor, and the radiator and detector are configured for assaying the wall in situ within a reactor core of the nuclear reactor. In some examples, the neutron flux includes an ambient thermal neutron flux of the reactor core.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1 is a schematic of an example system for assaying an object, with the system positioned adjacent to a wall of a pressure tube for a nuclear reactor;

FIG. 2 is a schematic of an example nuclear reactor with the pressure tube of FIG. 1 shown in situ;

FIG. 6 is a schematic of portions of another example system for assaying an object;

FIG. 7 is a schematic of portions of another example system for assaying an object;

DETAILED DESCRIPTION

Figure 3:
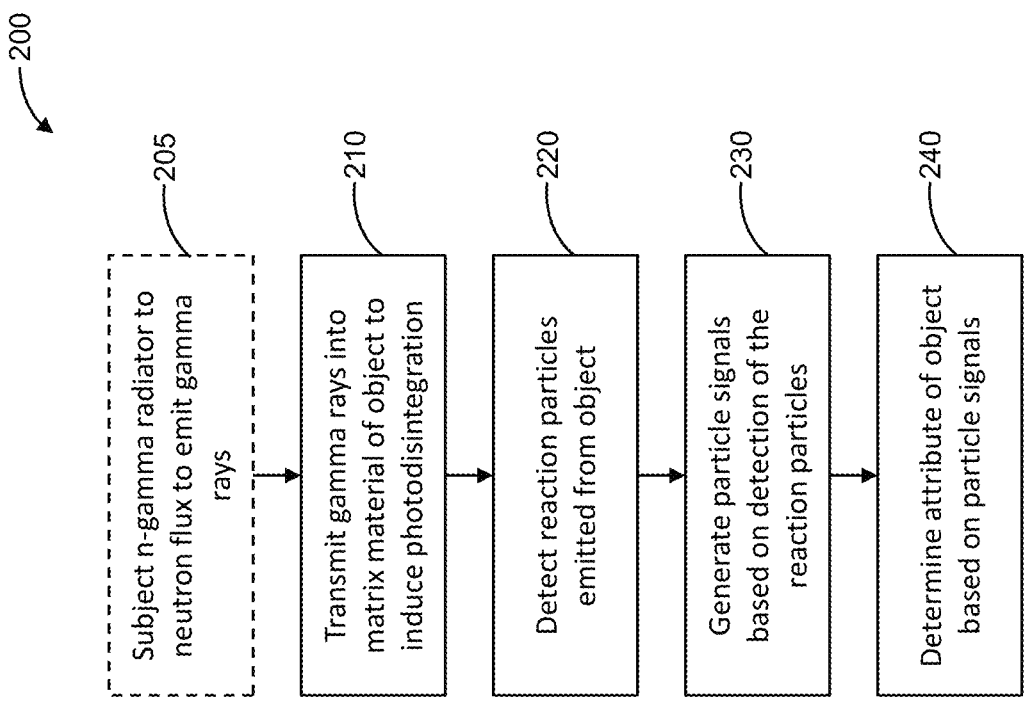
FIG. 3 is a flow chart of an example method for assaying an object, such as the pressure tube of FIG. 1, using a system like that of FIG. 1.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Disclosed herein are systems and methods for assaying an object having a matrix material and target nuclei in the matrix material. The disclosed systems and methods can facilitate determining an attribute of the object, such as, for example, a concentration of the target nuclei in the matrix material. In some examples, the matrix material can include a metallic matrix material, such as, for example, zirconium alloy. In some examples, the target nuclei can include deuterium nuclei. The present teachings can be applicable to other types of matrix materials and/or target nuclei.

According to some aspects of the present disclosure, the object can be assayed by transmitting gamma rays into the matrix material to induce photodisintegration of at least some of the target nuclei, whereby reaction particles of the nuclei are emitted from the object. The reaction particles can include, for example, protons and/or neutrons of the target nuclei.

Optionally, the gamma rays transmitted into the matrix material can be emitted from a gamma ray source such as, for example, an n-gamma radiator. For example, an n-gamma radiator can be subjected to a neutron flux to induce an n-gamma reaction, whereby gamma rays are emitted from the radiator and transmitted into the matrix material to induce the photodisintegration of the target nuclei.

At least some of the reaction particles emitted from the object can be detected using a reaction particle detector, and particle signals can be generated in response to detecting the reaction particles. In some examples, the reaction particles can include protons, and the particle detector may include a charged-particle detector for detecting the protons. In some circumstances, some of the protons released via photodisintegration toward the interior of the object may not escape the perimeter/surface of the object, and may be relatively difficult to detect using a detector that is external the object. Other protons may be near the surface of the object may be more likely to escape beyond the perimeter of the object and be emitted therefrom. This group of protons may be relatively easier to detect using a detector that is external the object, such as, for example, through ionization of material in the particle detector. In some examples (and optionally in addition to the use of a charged-particle detector), the reaction particle, detector may include a neutron detector configured to detect at least some of the neutrons emitted from the object. In some circumstances, neutrons may be able to travel greater distances through the object than protons, and some, neutrons may escape from deeper within the material matrix. In some embodiments, more neutrons than protons may escape the object. However, a neutron detector may be relatively less efficient than a charged-particle detector, which may mean that the neutrons can be detected with lower efficiency, since neutron detection may generally rely on interaction with atomic nuclei. In some embodiments, the use of a charged-particle detector to detect emitted protons may be preferable. Further, if the system is used in an environment that is exposed to other neutron flux(es), it may be preferable to utilize a charged-particle detector instead, of, or in addition to, a neutron detector to help reduce the noise or background interference from the ambient neutron flux (i.e., it may be hard for a neutron detector to distinguish between the reaction particles and the background neutron flux).

Optionally, an attribute of the object may be determined based at least in part on the particle signals. For example, the abundance of the reaction particles may be used to help determine a concentration of the target nuclei in the matrix material. In some embodiments, the quantity of reaction particles may be generally proportional to the concentration of the target nuclei in the matrix material (or at least in the segment of the object that is assayed). Conclusions about the concentration of target nuclei in the overall object may be extrapolated based on the object properties (if it is homogeneous, if it is exposed to similar environmental conditionals, etc.), measured reaction particle concentration and the like. Optionally, the object may be assayed at two or more different locations, and the results from each location compared and analyzed. In some circumstances the rate of detection of the reaction particles may be generally related to the concentration of the target nuclei in the object. In some examples, the particle signals can indicate a number of the reaction particles detected by the reaction particle detector, and the attribute can be determined by comparing the number of the reaction particles detected with a predetermined reference value.

Aspects of such methods and systems disclosed herein may be useful to help facilitate non-destructive and/or in situ assay of the object. Optionally, at least some aspects of the system may be portable, and may be configured for field use—as opposed to requiring the object to be brought into a laboratory or other such facility for testing. This may help facilitate in-situ testing, and may help facilitate assaying multiple locations on relatively large objects.

For example, as will be described in further detail below with reference to the drawings, the object to be assayed can include a wall of a pressure tube for a nuclear reactor, such as, for example, a pressurized heavy-water reactor (PHWR).

In some examples, the wall of the pressure tube can have a matrix material of zirconium alloy, any may include at least one of Zircaloy-2 and Zr-2.5Nb. Pressure tubes, and possibly other components of PHWRs can be exposed to deuterium while the reactor is in use, along with elevated temperatures, pressures, radiation exposure, ambient neutron flux(es) and the like. Analysis of some pressure tubes that have been removed from PHWRs at the end of their scheduled lifespan has revealed that deuterium atoms may ingress into the zirconium alloy wall material while the reactor is in use. In such applications, the deuterium ingress in the matrix material may lead to undesirable changes to the properties of the pressure tube sidewall, and may in some instances lead to embrittlement and cracking, which may be a life-limiting degradation mode. As a result, periodic measurement of deuterium concentration in the wall may be a regulatory requirement for a PHWR to ensure reactors are not operating with elevated levels of hydrogen in the pressure tube wall.

One known assay method that can be applied to PHWRs involves mechanical removal of a sample of material from the pressure boundary of the system, followed by hot vacuum extraction mass spectrometry (HVEMS). This method can have a number of disadvantages, such as, for example, requiring removal of a sample of the component of interest, leaving a scar on the pressure boundary of the pressure tube each time the test is performed, consuming the material of the sample, requiring transportation of a radioactive material fragment, and the inability to provide timely, on-site results. Another known method involves measuring the temperature of terminal solid solubility (TSS) to deduce hydrogen concentration. Although this TSS method may not necessarily require sample removal and transportation of radioactive material fragments, it has been found to produce inconsistent results in some situations.

One or more of the assay methods and systems described herein may help facilitate determining an attribute of the matrix material of the pressure tube wall, such as, for example, a concentration of deuterium therein, and may, in some cases, be performed while the pressure tube is in situ within a reactor core of the nuclear reactor. This may help facilitate the assay of the pressure tube wall without necessarily requiring removal of a sample of the pressure tube for assay, and may help facilitate a reduction in the cost, time, and complexity associated with assaying the pressure tube wall when compared to one or more known methods.

Referring to FIG. 1, an example system 100 for assaying an object 102 is illustrated schematically. In the example illustrated, the object 102 includes a generally axially extending wall 104 (also referred to as pressure tube wall 104) of a pressure tube 106 for a pressurized heavy water nuclear reactor 108 (also referred to as a PHWR—see FIG. 2). In the example illustrated, the pressure tube wall 104 has a matrix material 110 and target nuclei 112 have become dispersed within the matrix material 110 while the nuclear reactor 108 was in use. A variety of different nuclei may have been introduced into the matrix material, and in the example illustrated, the target nuclei 112 include at least some deuterium nuclei 114. The matrix material 110 can be a metallic matrix material. In the example illustrated, the matrix material 110 includes zirconium alloy. The zirconium alloy can be at least one of Zircaloy-2 and Zr-2.5Nb, or other such materials that may be suitable for use within the core of the nuclear reactor 108.

Preferably, the system 100 includes a least one gamma ray source to provide gamma rays that can be used to induce photodisintegration of the target nuclei 112. In the example illustrated, the system 100 includes a gamma ray source 116 that is configured to transmit gamma rays 118 into the matrix material 110 to induce photodisintegration of at least some of the deuterium nuclei 114, whereby at least a portion of the reaction particles 120 of the deuterium nuclei 114 may be emitted from the pressure tube wall 104. In the example illustrated, the reaction particles 120 include protons 120a and neutrons 120b of disintegrated deuterium nuclei 114.

Optionally, the gamma ray source 116 may be configured to transmit gamma rays 118 having an energy that is sufficient to disintegrate the deuterium nuclei 114 in the matrix material 110 that are the focus of a particular assay, but at an energy level that is not sufficient to disintegrate the atoms forming the matrix material 110. This may help facilitate disintegration of the deuterium nuclei 114 without materially affecting the integrity of the matrix material 110. This may be useful if the pressure tube 106 is intended to remain in operation and/or be re-used after the assay has been conducted. These energy levels may be selected based on the specific matrix materials and nuclei utilized in a given embodiment of the system.

In the example illustrated, the gamma ray source 116 is configured to transmit the gamma rays at an energy of at least 7.5 MeV. This can facilitate emission from the object 102 of protons 120a having an energy of between about 1 MeV and about 3 MeV. The gamma ray source may include a gamma ray emitting material that is generally, spontaneously emitting gamma rays. Alternatively, the gamma ray source may be configured as an on-demand type of source, that can be utilized to generate gamma rays when desired, but does not generally or spontaneously emit gamma rays. In the example illustrated, the gamma ray source 116 includes an n-gamma radiator 122 that is configured to emit the gamma rays 118 via an n-gamma reaction when subjected to an incoming neutron flux 124, but does not emit gamma rays in the absence of the neutron flux 124. The gamma rays 118 emitted from the n-gamma radiator can then be transmitted into the matrix material 110 to induce the photodisintegration of the deuterium nuclei 114. The n-gamma radiator 122 may include a variety of shielding layers, control mechanisms and the like to help channel the emitted gamma rays 118 in a desired direction (i.e. toward the object 102), and limit emission in other directions.

If an n-gamma radiator, such as n-gamma radiator 122 is used, the neutron flux 124 may be provided by any suitable neutron source. This may include a neutron emitting source/object (such as a neutron beam apparatus), and/or may include utilizing an ambient neutron flux that is present in the environment in which the assay is being conducted, including, for example, a thermal neutron flux that is present in the core of a nuclear reactor.

In the example illustrated, the system 100 includes a neutron source 126 for producing the neutron flux 124. In the example illustrated, the neutron flux 124 includes a thermal neutron flux. In the example, illustrated, the neutron source 126 includes an ambient thermal neutron flux 128 of a reactor core 130 (FIG. 2) of the nuclear reactor 108. This can help reduce or eliminate the need for a separate device (e.g. a thermal neutron beam emitter) for producing the thermal neutron flux required to induce an n-gamma reaction in the n-gamma radiator 122. Such ambient neutron flux may not be available if the assay is conducted outside the reactor core, in which case a thermal neutron beam emitter or the like may be provided.

The n-gamma radiator 122 may be formed from any suitable material and may, in some embodiments include Nickel. In the example illustrated, the n-gamma radiator 122 includes Nickel-58.

The n-gamma radiator 122 can have any suitable thermal neutron cross-section that may help produce a desired quantity of gamma rays in response to an anticipated neutron flux input. In the illustrated example, the thermal neutron cross-section of the n-gamma radiator is preferably at least 2 barns. In some examples, the n-gamma radiator 122 can have a thermal neutron cross-section of approximately 3 barns or more. Optionally, the n-gamma radiator 122 may produce gamma rays 118 having an energy of between about 7.5 and about 9.0 MeV to facilitate emission of protons 120a from the object 102 at an energy in the 3 MeV range. Optionally, the n-gamma radiator 122 can have a radiator thickness, in a direction parallel to the incoming neutron flux, that is generally sufficient to absorb most incident neutrons of the neutron flux 124. The radiator thickness can be selected so to not leave a large volume of self-shielded material, and to not unnecessarily scatter the gamma rays 118. The specific radiator geometry may depend on, for example, the thermal neutron capture cross section of the material of the radiator, the half-thickness for absorption of emitted photons in the energy range of interest, and the directionality of the incoming neutrons. In some examples, the radiator may include a nickel cylinder having a diameter of approximately 25 mm and a height of approximately 15 mm.

In the example illustrated, the pressure tube 106 extends longitudinally along a tube axis 131. The pressure tube wall 104 has a wall first side 104a, and a radially opposite, wall second side 104b. In the example illustrated, the wall first side 104a is an inner surface that faces an interior of the pressure tube 106, and the wall second side 104b is an outer surface that is exterior the pressure tube 106. The pressure tube 106 in this example has an inner diameter 105a, and a wall thickness 105b between the first and second sides 104a, 104b. In some examples, the inner diameter 105a can be approximately 104 mm, and the wall thickness 105b can be approximately 4.3 mm.

Optionally, at least some portions of the system 100 can be portable, and may be configured to be inserted into the interior of the pressure tube 106 while it is in situ within the reactor 108. This may help facilitate in situ testing, and may reduce the amount of removal and/or reconfiguration of the reactor 108. This may also help facilitate the continued use of a given pressure tube 106 after the assay is complete, depending on the outcome of the assay, as the tube 106 may remain installed and is less vulnerable to damage or other side effects as a result of removing and re-installing the tube 106 within the reactor core. This may also help reduce the need to transport irradiated material (i.e. used pressure tubes 106) outside the reactor 108 and to an offsite facility for testing. The system 100 may be generally modular in nature, such that some of its components can be positioned inside the tube 106 (such as the n-gamma radiator and detector, etc.), while other components may be positioned outside the radiation shielding (such as the controllers, computers and the like).

In the example illustrated, the n-gamma radiator 122 is portable, and positionable proximate the pressure tube wall 104. This can facilitate assay of the pressure tube 106 in situ within the reactor core 130. In the example illustrated, the n-gamma radiator 122 is positionable adjacent a first surface 132 of the pressure tube wall 104 for transmitting the gamma rays 118 into the matrix material 110 through the first surface 132. In the example illustrated, the first surface 132 includes an inner surface of the pressure tube wall 104 on the wall first side 104a, and the n-gamma radiator 122 is positionable within the inner diameter 105a of the pressure tube 106 adjacent the inner surface.

In the example illustrated, the system 100 further includes a reaction particle detector 134 configured to detect at least some of the reaction particles 120 emitted from the pressure tube wall 104, and to generate particle signals 136 in response to detection of the reaction particles 120. In the example illustrated, the particle detector 134 includes a proton detector configured to detect at least some of the protons 120a emitted from the pressure tube wall 104, but could otherwise include a neutron detector (to detect at least some of the neutrons 120b) or other suitable detector.

In some examples, it may be beneficial to optimize the particle detector 134 to reduce its response to gamma rays and beta particles originating from, for example, a high-neutron flux environment, and to help increase its response to protons having an energy of between about 1 and about 3 MeV. This may help improve the signal to noise ratio for the detector 134. In the example illustrated, the particle detector 134 has an active detector layer 134a having a layer thickness 140 in a direction of a flux of the protons 120a. In some examples, the layer thickness 140 is no greater than approximately a penetration distance of the protons 120a through the active detector layer 134a. For example, the thickness 140 may be between about 90% and about 110% of the penetration distance of the protons 120a in the active layer, and may be between about 95% and about 105%, between about 98% and about 102%, between about 98% and about 100% and/or may be about 100% of the penetration distance. This can help reduce background interference from, for example, gamma rays and beta particles, while facilitating detection of the emitted protons 120a. In some examples, the active detector layer 134a includes silicon, and the layer thickness 140 is no greater than approximately 60 microns.

In some examples, it may be beneficial to reduce the distance between the particle detector 134 and the first surface 132 of the pressure tube wall 104 to help facilitate detection of emitted reactions particles 120 and/or help reduce background noise. In the example illustrated, the detector 134 is also positionable within the interior of the pressure tube 106 and adjacent the first surface 132 of the pressure tube wall 104 for detecting at least some of the reaction particles 120 emitted from the first surface 132. In the example illustrated, the first surface 132 includes an inner surface of the pressure tube wall 104. In the example illustrated, the particle detector 134 is portable, and positionable within the inner diameter 135a of the pressure tube 106 adjacent the inner surface of the pressure tube wall 104. Such a configuration can facilitate a reduction in distance traveled by the protons 120a from within the matrix material 110 to the detector 134. This may also help facilitate use of the detector 134 without requiring access to the exterior of the pressure tube 106 (which in some cases, may be difficult to access). In some examples, the particle detector 134 can be intermediate the pressure tube wall 104 and the gamma ray source 116, and the gamma ray source 116 can be configured to transmit gamma rays 118 through at least a portion of the particle detector 134 and into the matrix material 110 through the first surface 132.

In the example illustrated, the system 100 further includes a processor 142 (e.g. any suitable computing device, computer, PLC or the like) configured to determine an attribute of the pressure tube wall 104 based on the particle signals 136. In some examples, the attribute can include a concentration of the deuterium nuclei 114 in the matrix material 110. For example, the abundance of the reaction particles 120 emitted from the pressure tube wall 104 can be proportional to the concentration of the deuterium nuclei 114 in the matrix material 110, and the rate of detection of the protons 120a by the particle detector 134 can be related to the concentration of the deuterium nuclei 114 in the pressure tube wall 104.

In some examples, the particle signals 136 can indicate a number of the protons 120a detected by the particle detector 134. The processor 142 may be configured to determine the attribute by comparing the number of the protons 120a detected with, for example, a predetermined reference value that is accessible to the processor 142. The predetermined reference value can be stored in a computer-readable memory, and can correspond to, for example, a number of protons (or other reaction particles) emitted, from a sample object having a known attribute, such as, for example, a known concentration of target nuclei (e.g. deuterium nuclei). The known concentration can be, for example, 0 ppm. In some examples, reference samples, for example, a first reference sample having no deuterium and a second reference sample having a known elevated level of deuterium, can be used for calibration.

Referring to FIG. 3, an example method 200 for assaying the object 102 (i.e. the pressure tube wall 104, in the example illustrated) is shown. At step 210, the gamma ray source 116 transmits the gamma rays 118 into the matrix material 110 to induce photodisintegration of at least some of the target nuclei 112 (i.e. the deuterium nuclei 114, in the example illustrated), whereby reaction particles 120 of the nuclei 112 are emitted from the pressure tube wall 104. At step 220, at least some of the reaction particles 120 emitted in step 210 (i.e. the protons 120a, in the example illustrated) are detected using the particle detector 134. At step 230, the particle signals 136 are generated in response to detecting the reaction particles 120 in step 220. Optionally, at step 240, an attribute of the pressure tube wall 104 is determined by the processor 142 based at least in part on the particle signals 136.

In some examples, the gamma ray source 116 can include the n-gamma radiator 122, and at step 205, the n-gamma radiator 122 can optionally be subjected to a neutron flux 124 to induce an n-gamma reaction, whereby the gamma rays 118 transmitted in step 210 are emitted from the n-gamma radiator 122. In such examples, prior to step 205, the radiator 122 can be positioned proximate the pressure tube wall 104. In such examples, prior to step 205, the radiator 122 can be positioned within the reactor core 130 of the nuclear reactor 108 (e.g. within the interior of the pressure tube 106) to subject the radiator 122 to the ambient thermal neutron flux 128 of the reactor core 130.

In some examples, during step 210, the gamma rays 118 can be transmitted into the matrix material 110 through the first surface 132 of the pressure tube wall 104. In some examples, the particle detector 134 can be positioned proximate the first surface 132 to detect at least some of the reaction particles 120 emitted from the first surface 132 during step 220.

In the example illustrated, the pressure tube 106 can be in situ within the reactor core 130 while at least steps 205 to 230 are performed. In some examples, the pressure tube 106 can be in situ within the reactor core 130 while step 240 is performed. This can facilitate providing on-site results of the assay.

Figure 4:
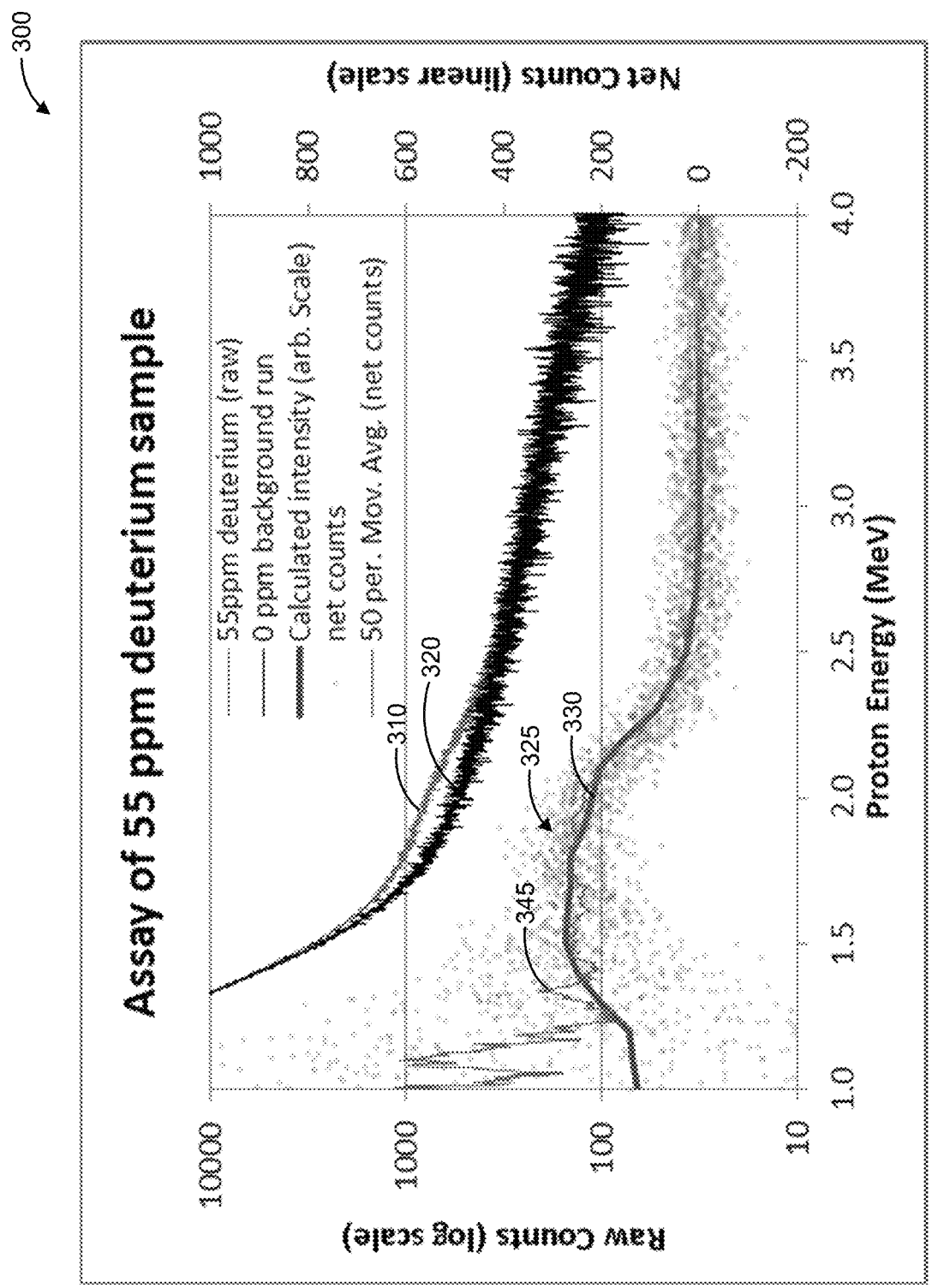
FIG. 4 is a chart showing a difference between spectra for a deuterium-loaded Zirconium sample and background as a function of proton energy, with a computer simulation for proton yield scaled and superimposed thereon.

Aspects of the systems and methods disclosed herein have been demonstrated experimentally using a thermal neutron beam as the neutron source for a nickel n-gamma radiator and a silicon (Si) particle detector. Tests showed a signature in the expected energy range for a deuterium-implanted Zr sample of known concentration, as established from HVEMS, when compared with the background spectrum from a deuterium-free Zr sample. Referring to chart 300 of FIG. 4, measurements for a sample with 55 ppm deuterium are shown (as first line 310) compared to the background spectrum from a sample with 0 ppm deuterium (shown as second line 320). The net spectrum between the first and second lines 310, 320 is plotted as scatter plot 325 on a linear scale (shown on the right axis of the chart 300). Superimposed on the net spectrum (plot 325) is a computer simulation for expected proton yield as a function of energy (shown as third line 330), scaled in amplitude to agree with the 50-period (50-channel) moving average (shown as fourth line 345) of the net spectrum (plot 325). Agreement between the data and simulation diverges below 1.5 MeV of proton energy, where background noise dominates. The relative yield for measurements of various samples increases as a function of deuterium concentration, providing a means of assessing the concentration.

Figure 5:
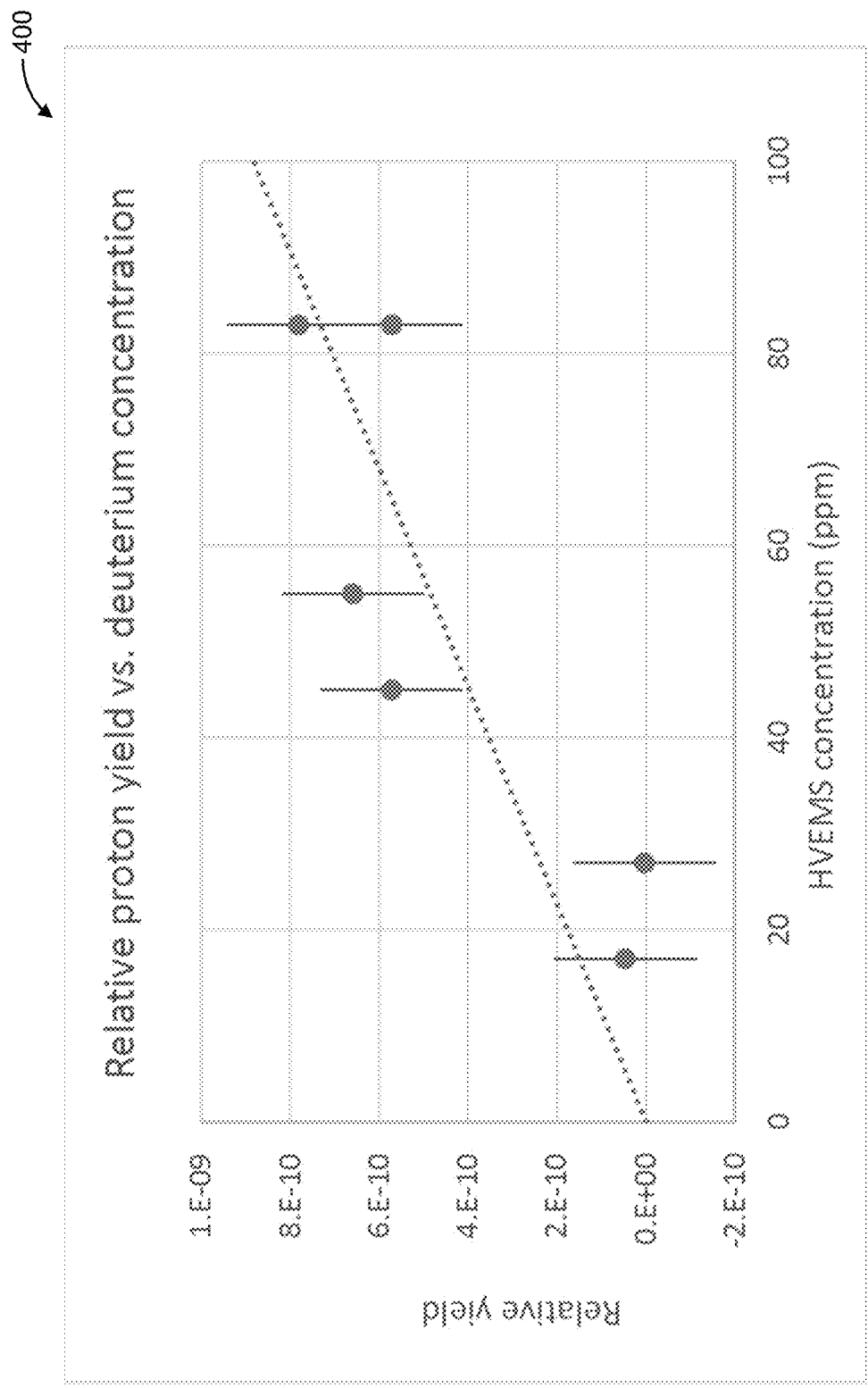
FIG. 5 is a chart showing relative proton yield as a function of deuterium concentration from hot vacuum extraction mass spectrometry (HVEMS)

Relative yield for various samples was taken as the net number of proton counts above 1.7 MeV, corresponding to the upper half of the proton spectrum, which was the part least influenced by background, divided by the total number of thermal neutrons per square centimeter incident on the n-gamma radiator. The results are plotted in chart 400 of FIG. 5. Collection times for the various samples varied from 20,000 seconds to nearly 190,000 seconds. Scatter about the linear trend line is largely due to uncertainties in background subtraction, and corresponds to approximately ±20 ppm, as seen from the chart 400. Reduction in the high count rate at low energy or a more elaborate background subtraction technique may help improve this value.

Referring to FIG. 6, portions of another example system 500 for assaying an object 502 is illustrated. The system 500 is similar to the system 100, and like features are identified by like reference characters, incremented by 400.

In the example illustrated, the system 500 includes a gamma ray source 516 (e.g. an n-gamma radiator 522) positionable adjacent a first surface 532 of the object 502 for transmitting gamma rays 518 into a matrix material 510 of the object 502 through the first surface 532. In the example illustrated, the system 500 further includes a particle detector 534 positionable adjacent a second surface 533 of the object 502 for detecting at least some of the reaction particles 520 (e.g. protons 520*a*) emitted from the second surface 533. In the example illustrated, the second surface 533 is spaced apart from the first surface 532. In the example illustrated, the first surface 532 is on a first side 504*a* of the object 502, and the second surface 533 is on a second side 504*b* of the object 502 opposite the first side 504*a*.

Referring to FIG. 7, portions of another example system 600 for assaying an object 602 is illustrated. The system 600 is similar to the system 100, and like features are identified by like reference characters, incremented by 500.

In the example illustrated, the system 600 includes a gamma ray source 616 (e.g. an n-gamma radiator 622) positionable adjacent a first surface 632 of an object 602 for transmitting gamma rays 618 into a matrix material 610 of the object 602 through the first surface 632. In the example illustrated, the system further includes a first particle detector 634*a* positionable adjacent the first surface 632 for detecting at least some of the reactions particles 620 (e.g. protons 620*a*) emitted from the first surface 632 and generating first particle signals 636*a*. The system 600 further includes a second particle detector 634*b* positionable adjacent a second surface 633 of the object 602 for detecting at least some of the reaction particles 620 emitted from the second surface 633 and generating second particle signals 636*b*. The second surface 633 can be spaced, apart from the first surface 632, and in the example illustrated, the first and second surfaces 632, 633 are on opposite sides of the object 602.

Figure 8:
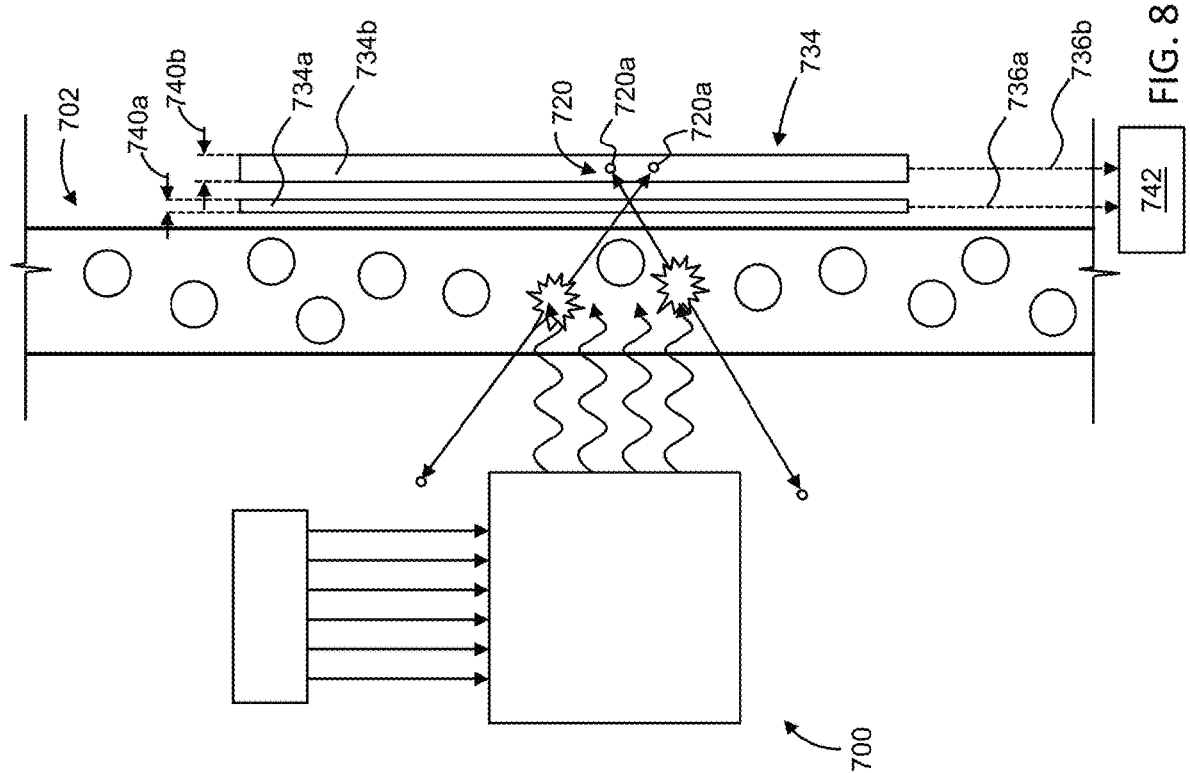
FIG. 8 is a schematic of portions of another example system for assaying an object.

Referring to FIG. 8, portions of another example system 700 for assaying an object 702 is illustrated. The system 700 is similar to the system 100, and like features are identified by like reference characters, incremented by 600.

In the example illustrated, the system 700 includes a coincidence-type particle detector 734 for detecting reaction particles 720 emitted from the object 702. The detector 734 includes an active first detector layer 734*a* and an active second detector layer 734*b* positioned in series with the first detector layer 734*a*. In the example illustrated, the first, detection layer 734*a* has a first layer thickness 740*a*, and the second detection layer 734*b* has a second layer thickness 740*b*. In some examples, the first layer thickness 740*a* is less than the second layer thickness 740*b*. In some examples, the first layer thickness 740*a* is 25 microns, and the second layer thickness 740*b* is 50 microns.

In high-radiation application environments, as may be encountered in a reactor core of a nuclear reactor during an outage, silicon detectors may be vulnerable to damage, and a more radiation-resistant detection system may be useful. In some examples, the detector 734 can include a polycrystalline chemical vapor deposition (pCVD) diamond detector (available from Applied Diamond Inc.). This type of detector may have more favorable radiation-resistant properties relative to, for example, a silicon detector, and may be useful in high-radiation application environments, such as during assay of pressure tubes in situ within a reactor core.

In the example illustrated, the detector 734 is positionable adjacent the object 702 with the first detector layer 734*a* intermediate the object 702 and the second detector layer 734*b*. The system 700 can further include a processor 742 configured to register detection events based on a relationship between a first particle signal 736*a* generated by the first detector layer 734*a* and a second particle signal 736*b* generated by the second detector layer 734*b*. For example, the processor 742 can be configured to register detection of reaction particles 720 (e.g. protons 720*a*) only upon receiving a first particle signal 736*a* from the first detector layer 734*a*, and a second particle signal 736*b* having a predetermined minimum amplitude from the second detector layer 734*b*. Such a coincidence configuration may help optimize the signal-to-noise ratio in certain application environments.

Figure 9:
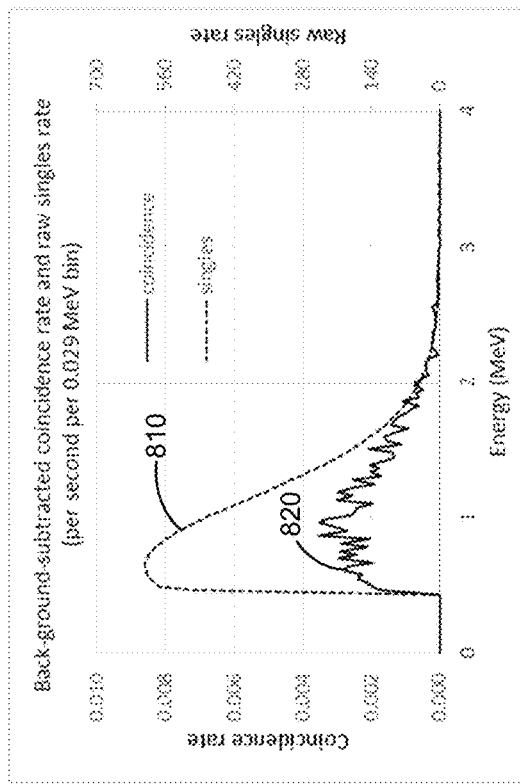
FIG. 9 is a chart showing coincidence detection rate and singles detection rate of a system like that of FIG. 8 as a function of proton energy.

For example, referring to FIG. 9, the chart 800 includes a singles detection rate line 810 representing first particle signals generated by a first detector layer of a coincidence-type particle detector similar to the detector 734, and a coincidence detection rate line 820 representing detection events registered based on a relationship between the first particle signals and second particle signals generated by a second detector layer of the particle detector. Requiring the second particle signals to have a certain minimum amplitude to trigger acceptance of the first particle signals generated by the first detector layer may provide a coincidence detection rate (shown on the left axis of the chart 800) that is about, for example, five orders of magnitude less than a singles detection rate (shown on the right axis of the chart 800).

Tests of pCVD diamond detectors for possible in-reactor deuterium assay were performed with thermal neutrons.

Figure 10:
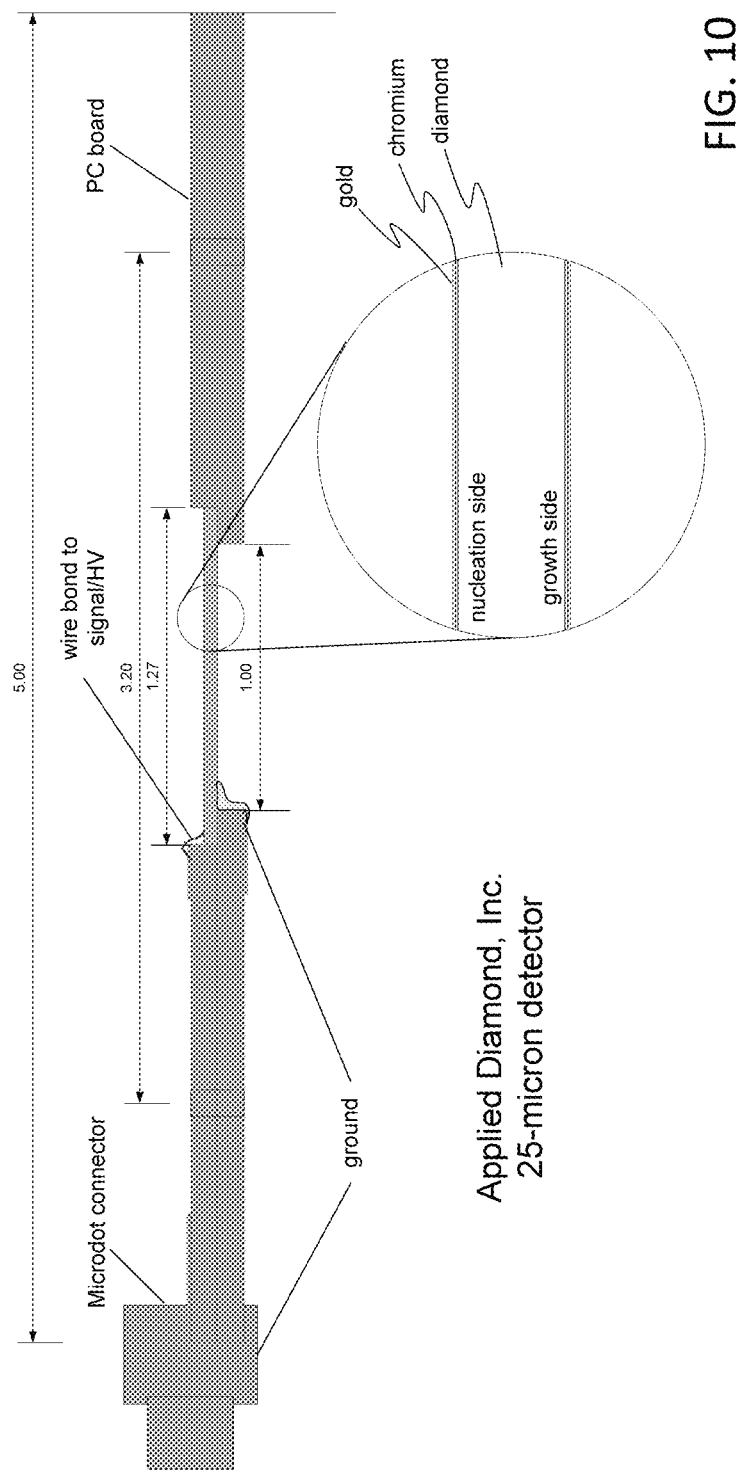
FIG. 10 is a schematic diagram of an example detector for a system like that of FIG. 1.

Referring to FIG. 10, a schematic of a pCVD diamond detector used for testing is shown.

Figure 11:
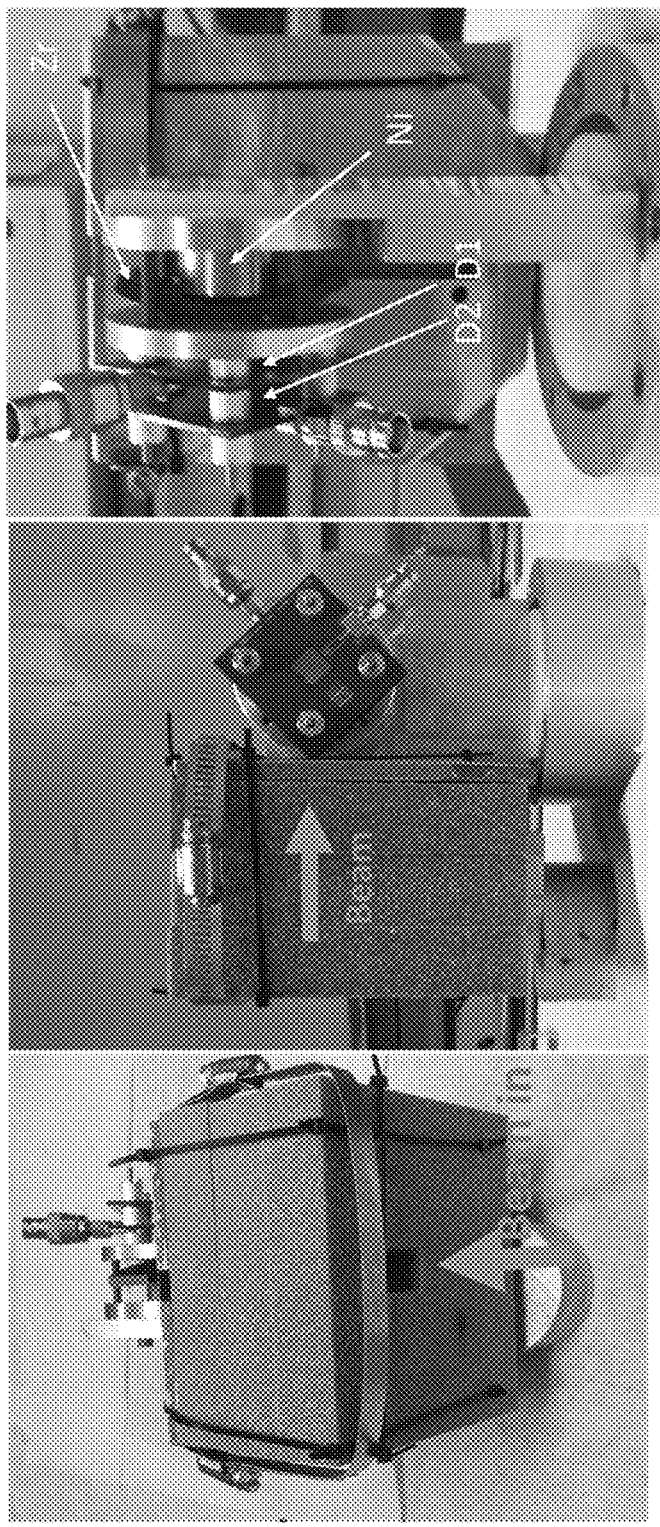
FIG. 11 shows various views of an experimental system to test a detector like that of FIG. 10.

Referring to FIG. 11, the test system used a thin (25 micron) first diamond detector D1, backed by a thicker (50 micron) second diamond detector D2 of the same type. Diamond detectors, particularly the polycrystalline variety, may have inferior energy resolution compared to Si detectors; alpha-particle bench tests gave half-maximum widths of ±40%.

A thermal neutron beam was incident on a Ni (n, gamma) radiator, which was in contact with Zr samples, one with 83 ppm deuterium or one without deuterium loading. The neutron beam intensity was about $4 \times 10^9$ neutrons per $cm^2$ per second.

Figure 12:
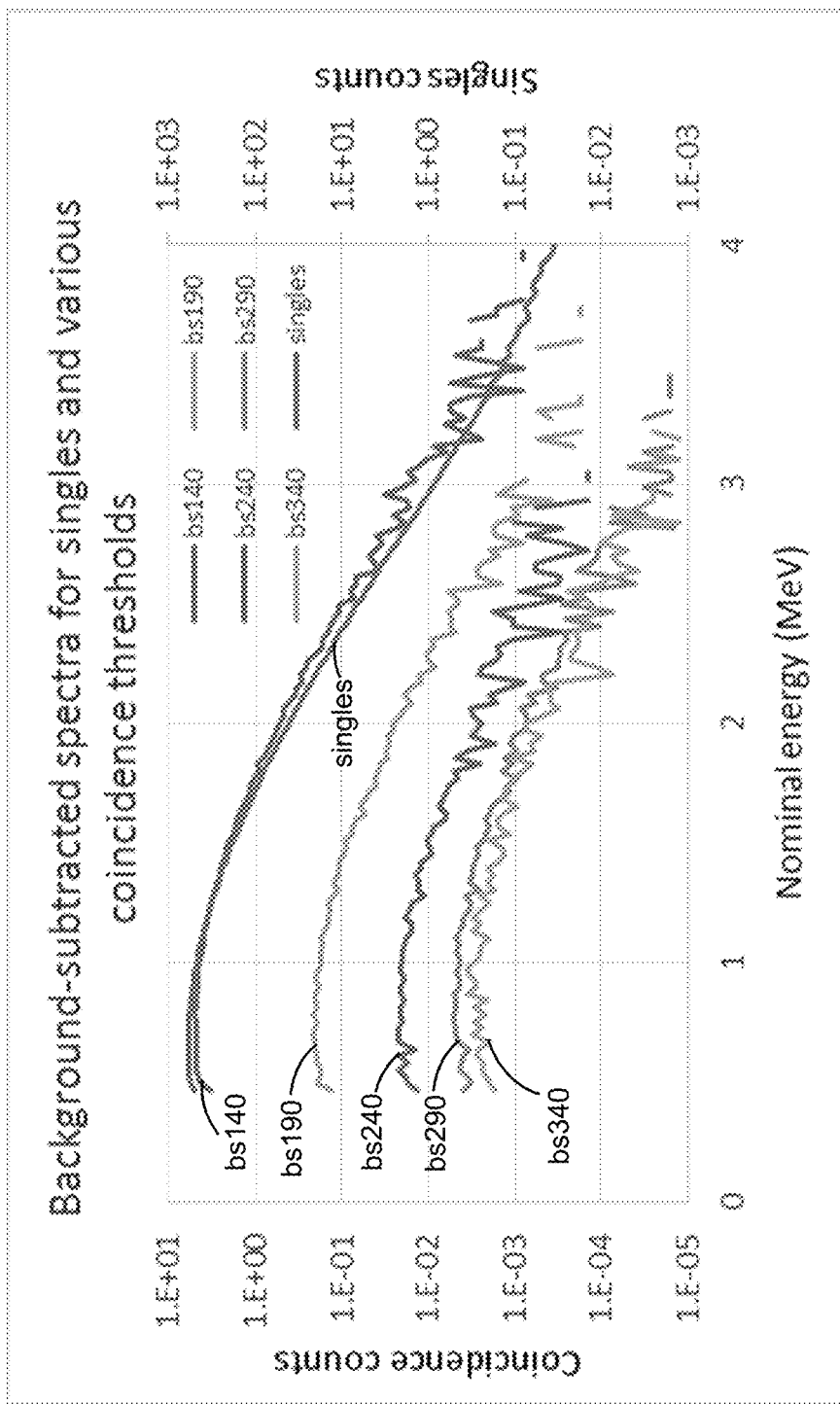
FIG. 12 is a chart showing background-subtracted spectra for singles and various coincidence count rates associated, with experimental testing using the system of FIG. 11.

Referring to FIG. 12, a series of trials—in which signals from the thinner, first detector D1 were collected when triggered by the thicker, second detector D2—were conducted for different thresholds, with deuterated and non-deuterated Zr samples. The single-channel analyzer thresholds triggering collection, 140, 190, 240, 290, and 340, were given as potentiometer readings and were not assigned energy values. Spectra acquired with the "blank", deuterium-free sample were subtracted from the corresponding ones acquired with the deuterium-loaded sample, scaled by the ratios of counting times. The background-subtracted spectra are shown in FIG. 12. There was a decrease in counts with increasing threshold until the bs290 curve is reached, suggesting that low-energy noise in the second detector D2 may be the dominant cause of triggers up to that point. The bs340 curve indicates a count rate of 0.11 protons per second.

Figures 13, 14:
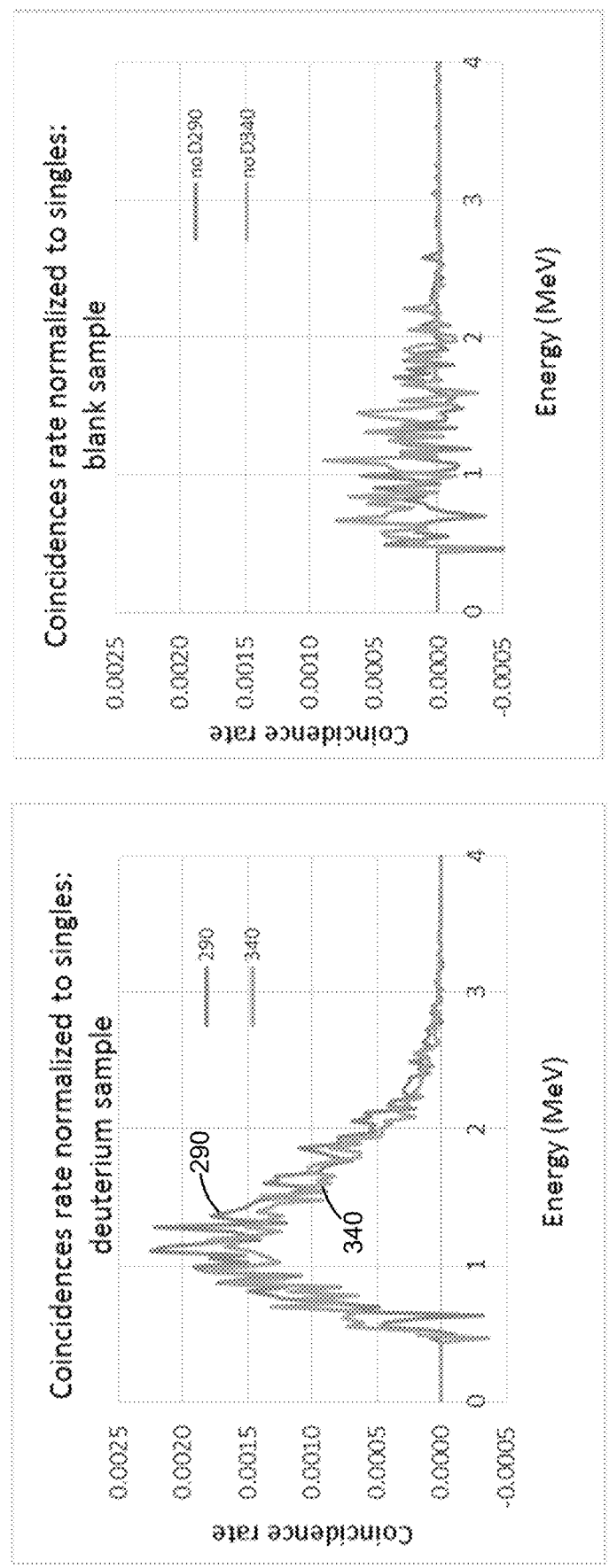
FIG. 13 is a chart showing results of an alternative analysis used to determine count rates associated with a deuterium-loaded sample subjected to testing using the system of FIG. 11.
FIG. 14 is a chart showing results of an alternative analysis used to determine count rates associated with a deuterium-free sample subjected to testing using the system of FIG. 11.

An alternative analysis includes: comparing the shape of the singles spectrum with those of the coincidence spectra, finding a low-energy normalization point, and subtracting the scaled singles shape from the coincidence spectrum. This can help avoid making assumptions about constancy of neutron beam rates in the analysis, and instead assumes negligible true coincidences at the low-energy point. Referring to FIG. 13, coincidence rates in excess of scaled singles rate are shown for a sample with 83 ppm deuterium loading, with the alternative analysis giving a count rate of 0.06 counts per second (cps) for the 340 threshold data and 0.07 cps for the 290 threshold data. Referring to FIG. 14, coincidence rates in excess of scaled singles rate are shown for a sample with no deuterium loading, with the same alternative analysis giving a result consistent with zero.

Figure 15:
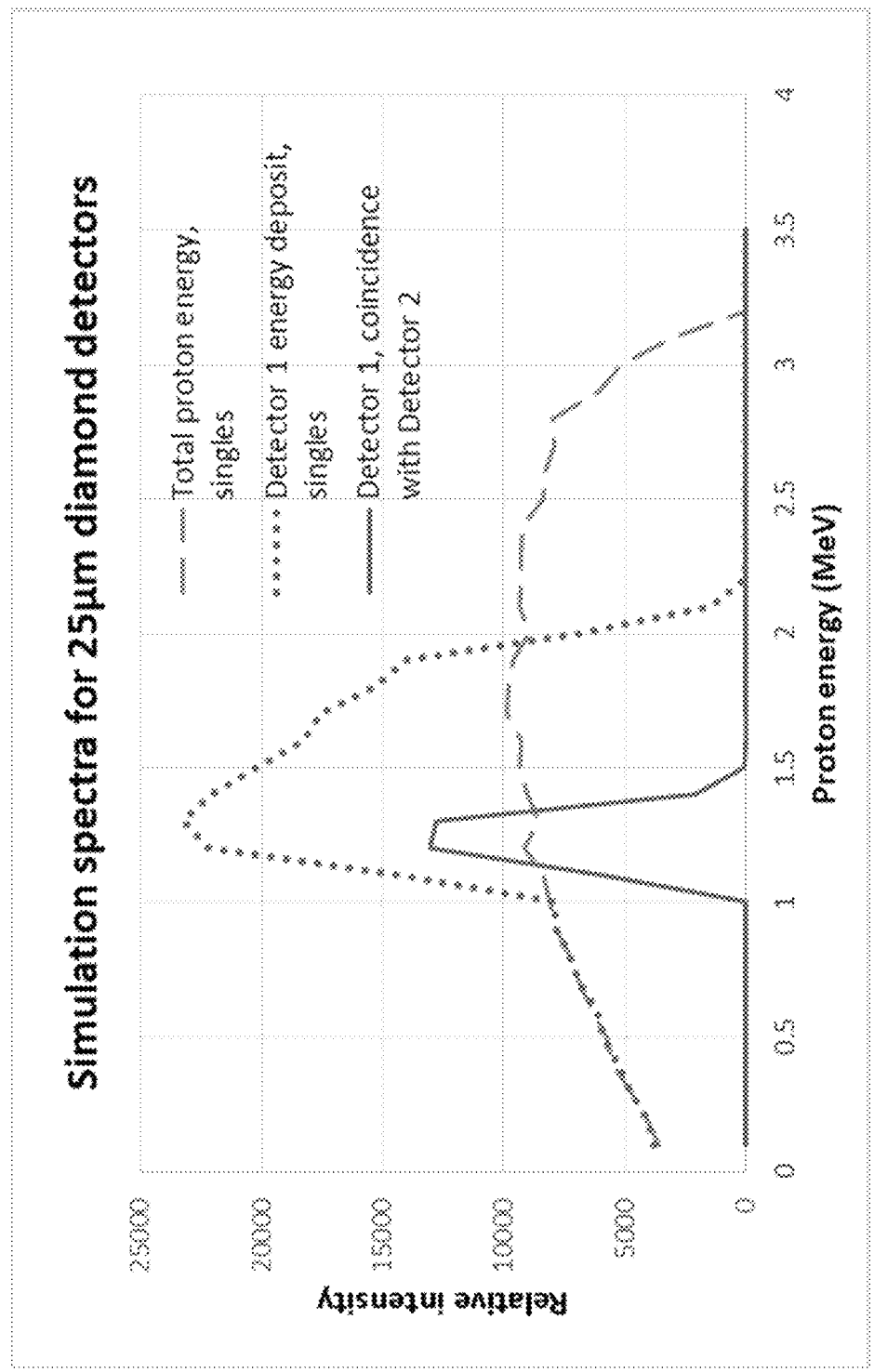
FIG. 15 is a chart showing simulated energy spectra with total emitted proton energy is shown in dashed line, energy deposited in a thin 25 micron diamond detector shown in dotted line, and coincidence subset of that data shown in solid.

For comparison, scaling of earlier results obtained using a Si detector predicts coincidence count, rates with the test system configuration shown in FIG. 11 of between 0.04 and 0.10 cps, for thresholds in the 0.1 to 1.0 MeV range. A computer simulation of the coincidence assembly uses the differential $(n, \gamma)$ production cross sections on nickel and the consequent proton yield for the $^2H(\gamma,p)n$ reaction, together with stopping power data for the materials and detectors of the set-up shown in FIG. 11, to predict singles and coincidence spectra. The simulation predicts the total energy singles spectrum to have the shape of the dashed line shown in FIG. 15. The energy deposited in a thin 25 micron diamond detector is shown by the dotted line in FIG. 15. This line shape is composed of a smoothly rising component that extends to about 2 MeV; protons exceeding that total energy pass through the detector and deposit less energy on the transit of the detector, with the highest-energy (3.1 MeV) particles leaving only 1.1 MeV in the first detector; this creates the bump in the singles spectrum between 1.1 and 2.0 MeV. For the requirement that at least 0.5 MeV be deposited in the second (trigger) detector, the simulation selects the coincidence subset of that data to be the solid line FIG. 15, a narrow spike centered around 1.2 MeV.

Figure 16:
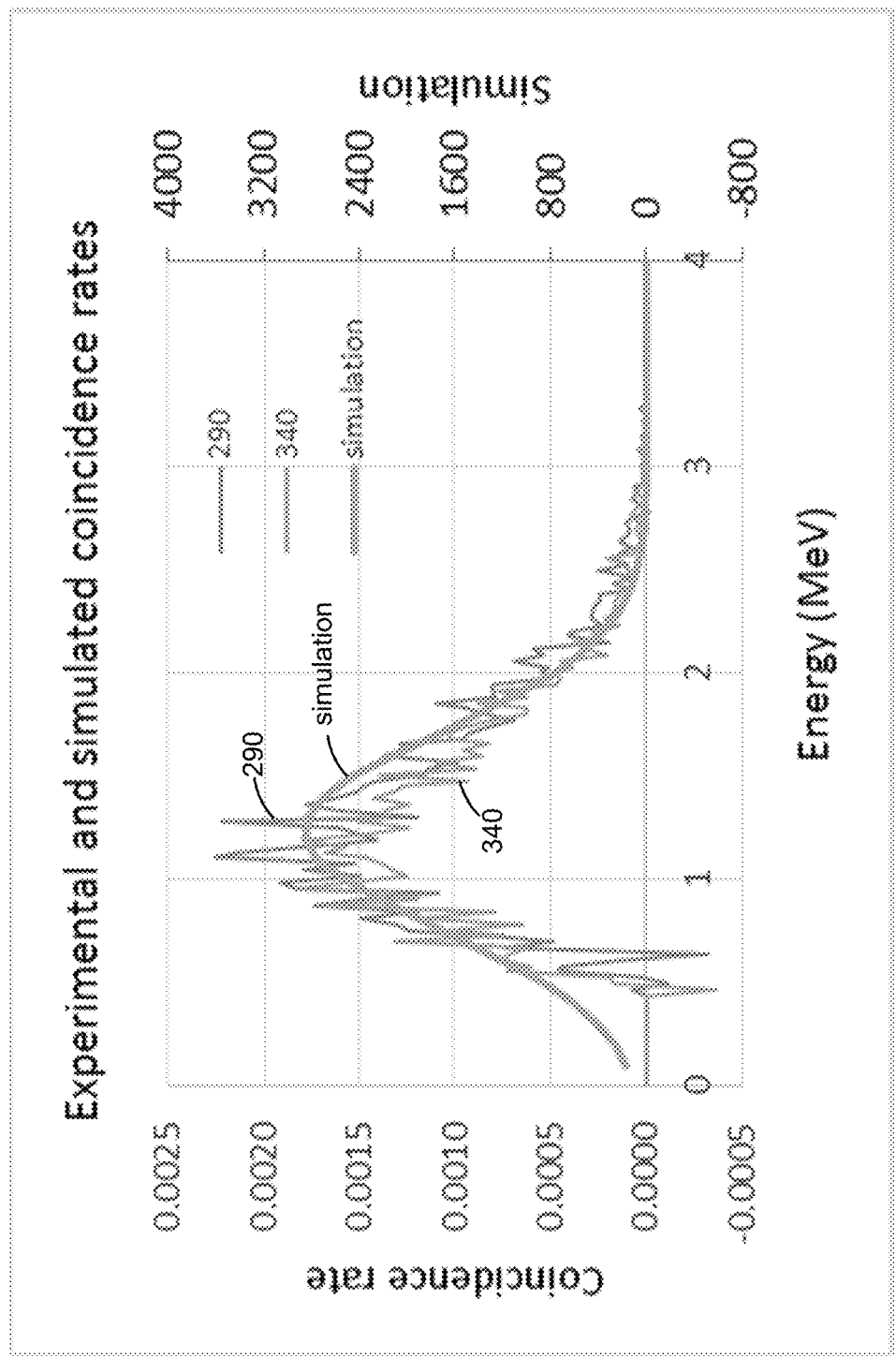
FIG. 16 is a chart showing a broadened simulation spectrum based on FIG. 15 for coincidence events (shown in a thick line), and measured coincidence rates in excess of scaled singles rate for 83 ppm deuterium loading (shown in thinner lines).

The energy resolution of the diamond detectors is relatively low, so it may be beneficial to artificially broaden the simulated spectrum for comparison with data. A width of ±55% at half maximum appears to be realistic; see FIG. 16.

It was concluded that a pCVD diamond detector coincidence system can be used to measure deuterium content in metal, based at least on the background-subtracted spectra, the shape excess over scaled singles spectra, the consistency check for blank samples, and the approximate agreement of measured rates with those scaled from the Si detector system.

The invention claimed is:

1. A method for assaying a wall of a pressure tube for a nuclear reactor, the wall having a matrix material and deuterium nuclei in the matrix material, the method comprising:
   a) transmitting gamma rays into the matrix material to induce photodisintegration of at least some of the deuterium nuclei, whereby reaction particles of the nuclei are emitted from the wall;
   b) detecting at least some of the reaction particles emitted in step (a) using a particle detector; and
   c) generating particle signals in response to detecting the particles in step (b).

2. The method of claim 1, further comprising determining an attribute of the wall based at least in part on the particle signals.

3. The method of claim 2, wherein the attribute comprises a concentration of the deuterium nuclei in the matrix material.

4. The method of claim 2, wherein the particle signals indicate a number of the reaction particles detected in step (b).

5. The method of claim 4, wherein determining the attribute comprises comparing the number of the reaction particles detected in step (b) with a predetermined reference value.

6. The method of claim 1, wherein the matrix material comprises a zirconium alloy.

7. The method of claim 6, wherein the zirconium alloy comprises at least one of Zircaloy-2 and Zr-2.5Nb.

8. The method of claim 1, further comprising, prior to step (a), subjecting an n-gamma radiator to a neutron flux to induce an n-gamma reaction, whereby the gamma rays transmitted in step (a) are emitted from the radiator.

9. The method of claim 8, further comprising, prior to step (a), positioning the radiator proximate the wall.

10. The method of claim 8, wherein the neutron flux comprises a thermal neutron flux.

11. The method of claim 8, wherein the radiator comprises a radiator material having a thermal neutron cross-section of at least 2 barns.

12. The method of claim 8, wherein the radiator material comprises Nickel.

13. The method of claim 8, wherein the radiator material comprises Nickel-58.

14. The method of claim 8, further comprising, prior to step (a), positioning the radiator within a reactor core of the nuclear reactor, and wherein the neutron flux comprises ambient thermal neutron flux of the reactor core.

15. The method of claim 1, wherein the pressure tube is in situ within a reactor core of the nuclear reactor while at least steps (a) to (b) are performed.

16. A method for assaying an object having a matrix material and target nuclei in the matrix material, the method comprising:
   a) subjecting an n-gamma radiator to a neutron flux to induce an n-gamma reaction, whereby gamma rays are emitted from the radiator;
   b) transmitting the gamma rays emitted from the radiator in step (a) into the matrix material to induce photodisintegration of at least some of the target nuclei, whereby reaction particles of the nuclei are emitted from the object;
   c) detecting at least some of the reaction particles emitted from the object in step (b) using a particle detector;
   d) generating particle signals in response to detecting the reaction particles in step (c), wherein the particle signals indicate a number of the reaction particles detected in step (c); and
   e) determining an attribute of the object based at least in part on the particle signals, wherein determining the attribute comprises comparing the number of the reaction particles detected in step (c) with a predetermined reference value and wherein the target nuclei comprise deuterium nuclei.

17. The method of claim 16, wherein the attribute comprises a concentration of the target nuclei in the matrix material.

18. A method for assaying an object having a matrix material and target nuclei in the matrix material, the method comprising:
   a) subjecting an n-gamma radiator to a neutron flux to induce an n-gamma reaction, whereby gamma rays are emitted from the radiator;
   b) transmitting the gamma rays emitted from the radiator in step (a) into the matrix material to induce photodisintegration of at least some of the target nuclei, whereby reaction particles of the nuclei are emitted from the object, wherein the matrix material comprises a zirconium alloy;
   c) detecting at least some of the reaction particles emitted from the object in step (b) using a particle detector; and
   d) generating particle signals in response to detecting the reaction particles in step (c).

19. The method of claim 18, further comprising determining an attribute of the object based at least in part on the particle signals.

20. The method of claim 19, wherein the attribute comprises a concentration of the target nuclei in the matrix material.

* * * * *